Aug. 30, 1960 H. HECHT ET AL 2,951,213

MODULATOR CIRCUIT

Filed Dec. 5, 1956

INVENTOR
HERBERT HECHT
HARRY C. THOMSON
BY
R. V. Craddock
ATTORNEY 2,951,213

MODULATOR CIRCUIT

Herbert Hecht, Wantagh, N.Y., and Harry C. Thomson, Los Angeles, Calif., assignors to Sperry Rand Corporation, a corporation of Delaware Filed Dec. 5, 1956, Ser. No. 626,333

4 Claims. (Cl. 332—40)

Figures 1, 2:
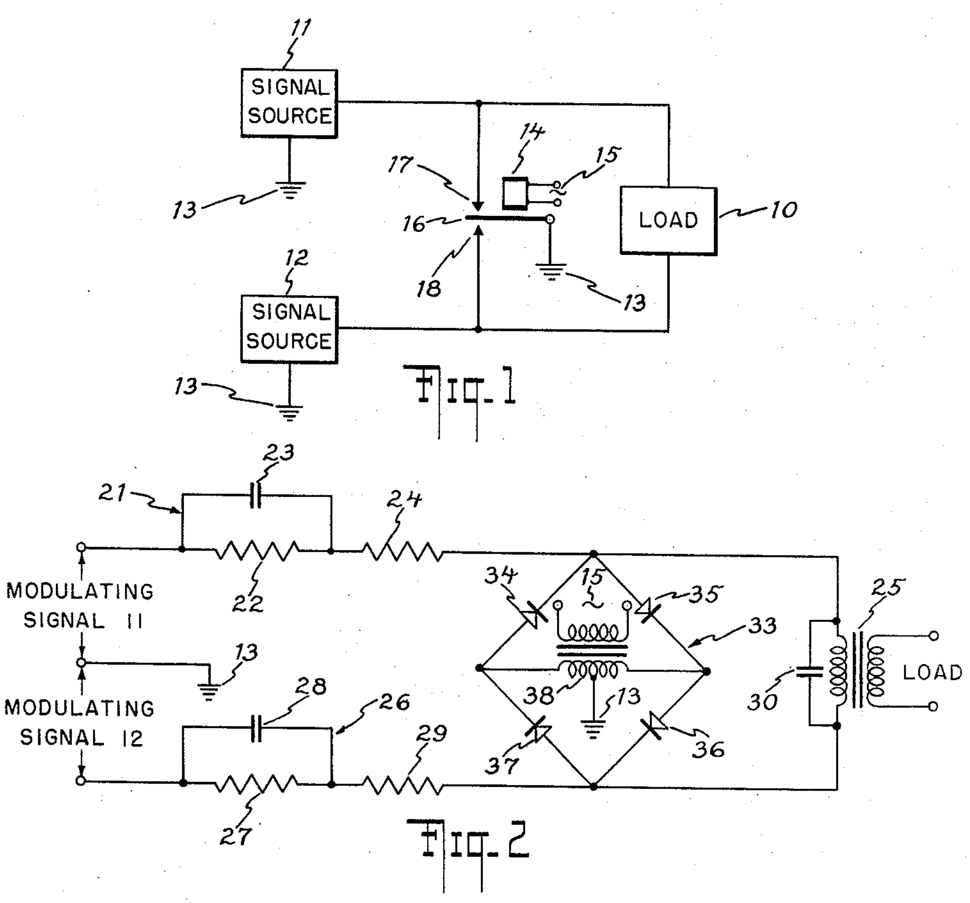

This invention relates to modulator circuits, and more particularly to circuits for the simultaneous addition of and amplitude modulation by several modulating signals. More particularly, the invention relates to a shunt type switching modulator which amplitude modulates a carrier in accordance with the sum of at least two input signals, irrespective of the polarity of the input signals.

Generally, the problem overcome by the present invention relates to providing means for simultaneously adding and converting to A.C. a multiplicity of D.C. or slowly varying A.C. signals, some of which may come from rate networks. Prior methods of summing and modulating signals are undesirable because of the effect of one network on another which distorts the amplitude or phase of the input signals. Particularly when summing higher derivative signals, it is not desirable to sum these signals in the conventional current addition manner because of the effect of one network loading or reflecting onto another network. For example, when two R.C. circuits are coupled together for summing purposes, each will load the neighboring circuit and may appear as a lag circuit to the other causing undesirable phase shift of the signals. This effect may be overcome under certain conditions by revising the circuit but usually at the expense of increased attenuation or other signal distortion. Also, any compensation based on continuous correction will not be valid if considerable variations in the parameter of any one circuit are required. Other means heretofore employed for adding signals from reactive high impedance networks involves the use of isolation amplifiers. This undesirable complication is avoided through the use of the instant invention.

In one environment of the present invention, the modulation circuit receives rate and displacement signals from aircraft attitude sensors which are summed and modulated to actuate servo systems that control the attitude of the aircraft. In the aircraft automatic pilot environment described, it is extremely important that the control signals maintain their characteristics without amplitude or phase distortion in order to effect precise control of the attitude of the aircraft.

The present invention provides a solution to the problem in the form of a switching device which alternately connects one of at least two inputs to one terminal of an output transformer or load while simultaneously grounding the other inputs and their respective output transformer or load terminals in sequence.

A primary object of the present invention is therefore to provide a means whereby two or more signals may be summed and modulated, the resulting signal being responsive to the magnitude and polarity of the input signals.

Another object of the present invention is to provide a means whereby two or more signals may be simultaneously summed and modulated without reflecting any other signals at the load.

A further object of the present invention is to provide a means whereby several signals may be summed and modulated with a minimum of signal distortion.

To accomplish the foregoing and other more specific objects which will hereinafter appear, our invention resides in the circuit elements and their relation one to another as are hereinafter described in the following specification.

The specification is accompanied by drawings, in which like reference characters indicate like elements, in which:

Fig. 1 is a block diagram of a modulator circuit embodying features of the present invention; and Fig. 2 is a detailed schematic diagram of a preferred embodiment of the invention.

Referring to the drawings, and more particularly to Fig. 1, the modulator circuit shows a load 10 having at least two input connections or terminals, one of which is connected to a first signal source 11 which provides a signal that may be a D.C. signal or a relatively slowly varying A.C. signal. Another input connection of said load is coupled to a second signal source 12 which also provides a D.C. signal or a relatively slowly varying A.C. signal. Both signal sources may be connected or referenced to a common third terminal or ground reference as indicated at 13. Connected between the input terminals of the load 10 is a means for selectively coupling the load input terminals to the third terminal or ground reference 13. This may be accomplished, for example, by use of a vibrating reed type of switching device 14 excited by a suitable A.C. switching or carrier wave source 15 such as a 400 cycle current. The vibrating contact arm 16 is coupled to the common third terminal or ground reference 13. The arm 16 alternately connects to contact 17 and contact 18 depending upon the frequency of the A.C. source 15 in a conventional manner. Contact 17 is connected to one of the input terminals of the load 10 while contact 18 is connected to another input terminal of the load. The effect of this arrangement is to provide a shunting switch device across the load 10.

With both signal sources 11 and 12 operative and supplying signals to the circuit, the effect of the signals on the load 10 is determined by the operation of switching device 14. With the contact arm 16 positioned in its upper position as viewed in the drawing such that the arm 16 connects to contact 17, signal source 12 is connected through the load 10 via contact 17 and arm 16 to ground 13 while signal source 11 is shorted to ground 13 via contact 17 and arm 16. On the next half cycle of the switching signal 15, arm 16 connects to contact 18 and source 12 will be grounded through contact 18 and arm 16 while source 11 will be connected through the load 10 to contact 18 and through arm 16 to ground 13. Thus, the signal across the load 10 will have a frequency determined by the switching rate of the carrier or switching signal source 15 and an average amplitude corresponding to the sum of the two input signal source amplitudes without distortion of the characteristics of either signal.

Reference is now made to Fig. 2 to describe a preferred embodiment of the present invention. The signal source 11 and signal source 12 of Fig. 1 supply modulating signals 11 and 12 respectively as indicated in Fig. 2, each of which is referenced to a common ground reference potential 13. Signal 11, which may be a D.C. signal or a relatively slowly varying A.C. signal, is connected to a suitable network 21 comprising resistor 22 and capacitor 23. The function of the series resistor 22 and parallel capacitor 23 is to provide displacement and rate components respectively of the signal 11 in a known manner. The network 21 is connected to isolating resistor 24 which in turn is connected to one terminal of the primary of the output transformer 25. The secondary of transformer 25 is coupled to the load. Similarly, signal 12 is connected through a suitable network 26 which may also provide a phase advanced signal similar to that provided by network 21. Resistor 27 and capacitor 28 form network 26 which is coupled to isolating resistor 29 that in turn is connected to the other terminal of the primary of output transformer 25. A suitable load circuit may be connected to the secondary of output transformer 25 while the primary of the output transformer may be tuned with a suitable capacitor 30 in parallel therewith. Also connected in shunt across the two terminals of the primary of the transformer 25 is a variable impedance bridge 33 comprising four arms that are interconnected in a known manner. In the embodiment shown, the variable impedance devices of the bridge 33 may comprise four crystal diodes, for example, numbered 34, 35, 36 and 37. One terminal of diode 34 is coupled to one terminal of diode 35. One terminal of diode 36 is coupled to one terminal of diode 37. The remaining terminals of diodes 34 and 37 are connected together as are the remaining terminals of diodes 35 and 36.

The junction of the terminals of diodes 34 and 35 are connected to one terminal of the primary of transformer 25 while the junction of the terminals of diodes 36 and 37 are connected to the other terminal of the primary of transformer 25. One terminal of the secondary of transformer 38 is connected to the junction of the terminals of diodes 34 and 37 while the other terminal of the secondary of transformer 38 is connected to the junction of the terminals of diodes 35 and 36. The center tap of the secondary of transformer 38 is connected to ground, 13. A suitable A.C. switching source or carrier wave 15 is applied to the primary of transformer 38.

The operation of the modulating circuit of Fig. 2 will now be explained with reference to the drawing. During one half cycle of the carrier or switching wave 15, the voltage appearing across the secondary of transformer 38 will cause current flow through diodes 34 and 35. Under these conditions modulating signal 11 will be short circuited through diodes 34 and 35 to ground 13. At the same time, modulating signal 12 will be applied to the primary of transformer 25. Modulating signal 12 will flow through transformer 25 and through conducting diodes 34 and 35 thence through the secondary of transformer 38 to ground 13. This is equivalent to contact arm 16 connecting to contact 17 in Fig. 1. During the next half cycle of the carrier or switching wave 15, the diodes 36 and 37 will conduit, thus producing a condition equivalent to that shown in Fig. 1 when arm 16 connects to contacts 18. In the latter case, modulating signal 12 is shunted to ground 13 through diodes 36 and 37 while signal 11 returns to ground 13 through the primary of transformer 25 and conducting diodes 36 and 37 to the secondary of transformer 38 that is center-tapped to ground. By this means, addition of the input signals is inherently performed across the primary of transformer 25 due to the switch action of the variable impedance bridge and shunting means.

By utilizing balanced variable impedance devices or diodes in the bridge 33 with a center-tapped transformer 38, an equal impedance path is established through the upper arms and lower arms of the bridge. During the half cycle of the switching wave 15 that diodes 34 and 35 conduct, there is an equal impedance path for the switching signal through the diodes 34 and 35 and the secondary of transformer 38 such that the switching signal is not reflected at the primary of transformer 25. In a similar manner, an equal impedance path through diodes 36 and 37 is established on alternate half cycles of the switching wave 15 with the result that the switching wave is not reflected to the load. By means of this arrangement, a switching means operable in accordance with the alternating current carrier wave is devised for selectively rendering said modulating signals ineffective whereby the load circuit or output transformer is responsive to the sum of the modulating signals irrespective of the polarity of said modulating signals and is not responsive to the carrier wave.

In order to obtain perfect balancing of the variable impedance bridge 33, additional balancing resistors (not shown) may be placed in each arm of the bridge in series and in shunt with respect to each diode in order to precisely balance the bridge with respect to the switching signal, the input signal sources and the output transformer in known fashion such that the diode bridge would then be a double balanced bridge or modulator.

The purpose of the tuning capacitor 30 is to achieve higher voltage gains from the modulator as well as to secure more nearly sinusoidal output waveshapes. The tank comprising the capacitor 30 and the primary of transformer 25 is preferably tuned to approximately the carrier frequency for optimum results.

In the environment of the preferred embodiment of the invention, the resistors 24 and 29 serve several purposes. One of the functions of the aforesaid resistors is to limit discharge currents from capacitors 23 and 28 and thus prevent damage to the diodes due to the excessively high currents. Furthermore, the resistors 24 and 29 form part of the rate plus displacement networks 21 and 26 respectively such that the ohmic values of said resistors are associated with the parameters of the rate and displacement networks. With this type of modulator and its inherently low interaction between networks, the ohmic value of resistors 24 and 29 may be made relatively small, thus resistors 22 and 27 may be made proportionately smaller also. This results in a relatively low impedance rate and displacement network thereby permitting the passage of larger quantities of signal power, all of which results in a circuit with better signal to noise ratio that requires less power amplification following the modulation to perform useful work. Resistors 24 and 29 together with the impedance of networks 21 and 26 act alternately to drop the signal voltage when the switch is actuated to alternately ground the modulating signals. If there were no resistance in the circuit, the only limiting resistance would be the internal impedance of the signal source; and not only could the diode currents be large but, depending upon the actual impedance of the signal source, the switching might be ineffective.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A modulating circuit comprising a load having first and second terminals, a first modulating signal source coupled to said first terminal for supplying a first modulating signal, a second modulating signal source coupled to said second terminal for supplying a second modulating signal, a variable impedance bridge connected between said first and second terminals, said bridge having four diodes, one in each arm of the bridge wherein the anode of the first diode is connected to the cathode of the second diode forming a first junction, the anode of the third diode is connected to the cathode of the fourth diode forming a second junction, the cathode of the first diode is connected to the anode of the fourth diode forming a third junction and the anode of the second diode is connected to the cathode of the third diode forming a fourth junction, said first and second junctions are connected to said first and second terminals of the load, respectively, a source of alternating current potential, and means connected between said third and fourth junctions operable in accordance with said alternating current potential for selectively varying the impedance of said diodes thereby selectively rendering said modulating signals ineffective.

2. A modulating circuit of the character described in claim 1 in which said last mentioned means includes a center tapped transformer having the secondary thereof center tapped to ground and connected to said third and fourth junctions and the primary thereof connected to said alternating current potential.

3. In combination, an electrical load, a first signal source for supplying a first input signal to said load, a second signal source for supplying a second input signal to said load, said first and second signal sources being connected in series with said load, switch means connected to said first and second signal sources and to said load for selectively short-circuiting opposite ones of said first and second signal sources when said switch means is alternately actuated, and means including a switching signal source connected to said switch means for the alternate actuation of said switch means at a frequency that is appreciably greater than the frequency of either of said first and second signal sources in order that the load is alternately responsive to said first and second signals respectively at the switching frequency rate, said switch means including means for preventing the application of the energy of said switching signal source to said load.

4. The combination as claimed in claim 3 wherein said switch means is an electromagnetically actuated relay wherein the actuating coil and the actuated contacts are electrically isolated with respect to each other.

References Cited in the file of this patent

UNITED STATES PATENTS

| | | |
|---|---|---|
| 1,835,099 | Stone | Dec. 8, 1931 |
| 1,906,269 | Hough | May 2, 1933 |
| 2,005,798 | Moser | June 25, 1935 |
| 2,352,634 | Hull | July 4, 1944 |
| 2,358,610 | Weber | Sept. 19, 1944 |

OTHER REFERENCES

Pub. I, Waveforms, by Chance et al., Radiation Laboratory Series, McGraw-Hill Book Co., 1949, pp. 392, 395, 404.